(12) United States Patent
Launiere

(10) Patent No.: US 6,220,813 B1
(45) Date of Patent: Apr. 24, 2001

(54) WORKPIECE TRANSFER APPARATUS AND METHOD FOR TRANSFER DIE SYSTEMS AND THE LIKE

(76) Inventor: Timothy R. Launiere, 3025 4-Mile Rd., Grand Rapids, MI (US) 49544

( * ) Notice: Subject to any disclaimer, the term of this patent is extended or adjusted under 35 U.S.C. 154(b) by 0 days.

(21) Appl. No.: 09/176,497

(22) Filed: Oct. 21, 1998

Related U.S. Application Data

(60) Provisional application No. 60/063,130, filed on Oct. 21, 1997.

(51) Int. Cl.$^7$ ................................................. B65G 35/00
(52) U.S. Cl. ......................... 414/749.1; 74/490.04; 198/468.6; 901/21
(58) Field of Search .................. 414/749.1, 751.1, 414/752.1, 753.1; 74/490.01, 490.03, 490.04, 490.09, 490.13; 901/21, 16; 198/430, 468.2, 468.6, 750.14, 750.11

(56) References Cited

U.S. PATENT DOCUMENTS

| | | | |
|---|---|---|---|
| 4,988,261 | * 1/1991 | Blatt | 414/749.1 |
| 5,092,449 | * 3/1992 | Bolin et al. | 65/260 X |
| 5,355,744 | * 10/1994 | Yanagisawa | 74/490.09 |
| 5,476,358 | * 12/1995 | Costa | 414/749.1 |
| 5,611,248 | * 3/1997 | Peltier | 414/749.1 X |
| 5,971,254 | * 10/1999 | Naud et al. | 74/490.09 X |

\* cited by examiner

Primary Examiner—Donald W. Underwood
(74) Attorney, Agent, or Firm—Price, Heneveld, Cooper, DeWitt & Litton

(57) ABSTRACT

A workpiece transfer apparatus includes a support member and first and second control shafts. The control shafts are rotatably supported by the support member in a spaced-apart configuration. A workpiece support is operably connected to the first and second control shafts. The workpiece support is shaped to support a workpiece during transfer. Rotation of the first control shaft shifts the workpiece support in a first direction, and rotation of the second control shaft shifts the workpiece support in a second direction. A lead screw is disposed parallel to the control shaft, and shifts the workpiece support along the lead screw upon rotation of the same.

13 Claims, 7 Drawing Sheets

WORKPIECE TRANSFER APPARATUS AND METHOD FOR TRANSFER DIE SYSTEMS AND THE LIKE

CROSS-REFERENCES TO RELATED APPLICATIONS

This application claims the benefit of U.S. Provisional Application Ser. No. 60/063,130, filed Oct. 21, 1997.

BACKGROUND OF THE INVENTION

This invention relates to automated transfer systems and apparatus for precisely and automatically moving desired objects such as workpieces from one station to another, for progressive manufacturing operations such as the step-by-step metal-forming procedure known as "transfer die" sets or stations, by which raw material such as sheet metal stock is progressively shaped into a desired configuration by passing through a number of stamping or pressing stations that each impart a change of shape leading from the original unworked stock to the final desired configuration. In a broader sense, the invention relates to a program-controlled computer-directed transfer system for the automated transfer of essentially any given workpiece or other article from one station to another along a predetermined sequence thereof, by picking up each such article, moving it to the next successive station, depositing it at that station and leaving it there for a predetermined length of time, followed by a desired number of successive such steps leading progressively from a first to a last such station.

SUMMARY OF THE INVENTION

More particularly, the present invention relates to an automated transfer system of the general type noted above which utilizes carrier assemblies mounted in spaced relation along at least a pair of, and preferably three, elongated, parallel control shafts which are separately rotatably drivable in a precise and programmatically controllable manner to simultaneously move each such carrier assembly, or a component portion thereof, in any of three different axes of motion, or in any combination of such axial movements. These include one axis parallel to that of the control shafts, and two other axes which are perpendicular to the control shafts and perpendicular to one another, whose conjoint effect is to impart movement to a pickup arm or the like in any direction with respect to the control shafts, at least within a 90° sector (i.e., a quadrant).

In a preferred embodiment, two or more of the carrier assemblies are disposed along a common set of control shafts and physically connected together in a manner which mutually stabilizes their relative positions and which also unifies their operational movements. Further, in a typical such embodiment (particularly as used in a transfer die system), a pair of such control shaft-and-carrier assembly installations are disposed in mutually spaced, parallel relation to one another, so that their programmatically controlled operational members may move toward and away from one another, or in some other such coordinated sequence, and thereby engage, move and disengage from workpieces disposed therebetween, to cooperatively move them from one station to another.

These and other advantages of the invention will be further understood and appreciated by those skilled in the art by reference to the following written specification, claims, and appended drawings.

DETAILED DESCRIPTION OF THE PREFERRED EMBODIMENTS

For purposes of description herein, terms "upper", "lower", "right", "left", "rear", "front", "vertical", "horizontal", and derivatives thereof shall relate to the invention as oriented in FIG. 1. However, it is to be understood that the invention may assume various alternative orientations and step sequences, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Figure 1A:
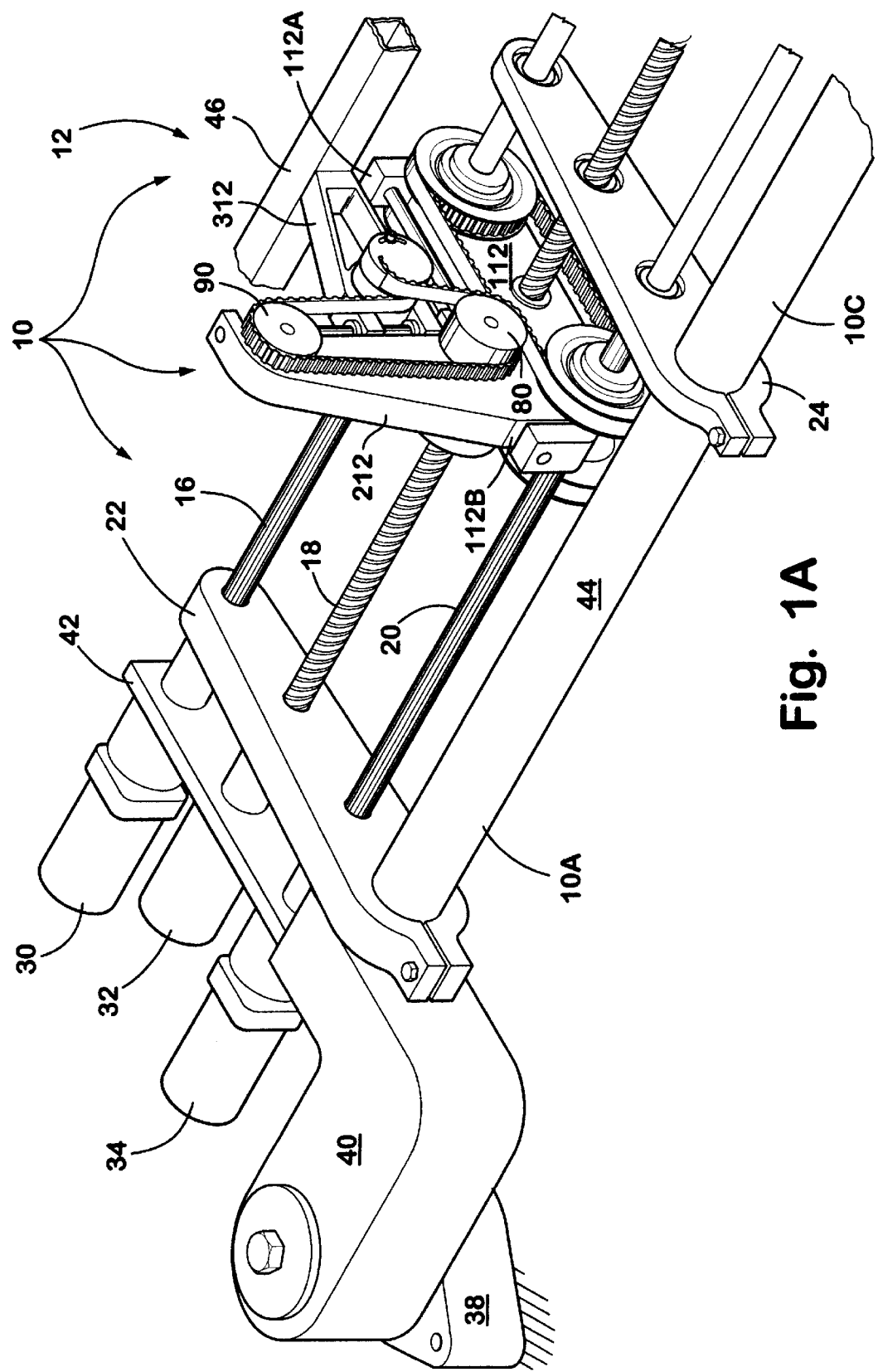
FIG. 1a is a fragmentary, perspective view of a first carrier assembly.
Figure 1B:
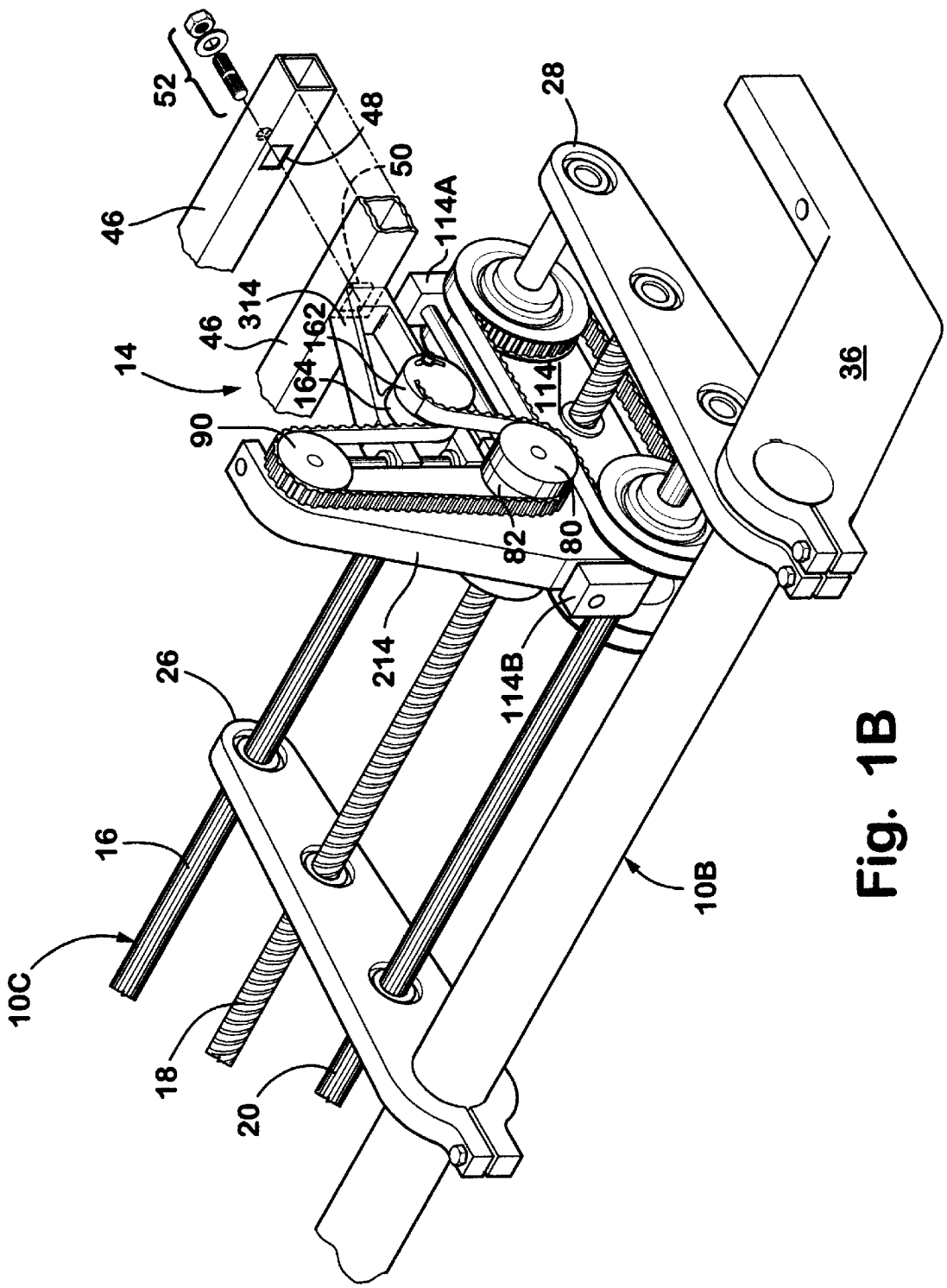
FIG. 1b is a fragmentary, perspective view of a second carrier assembly.
Figure 2:
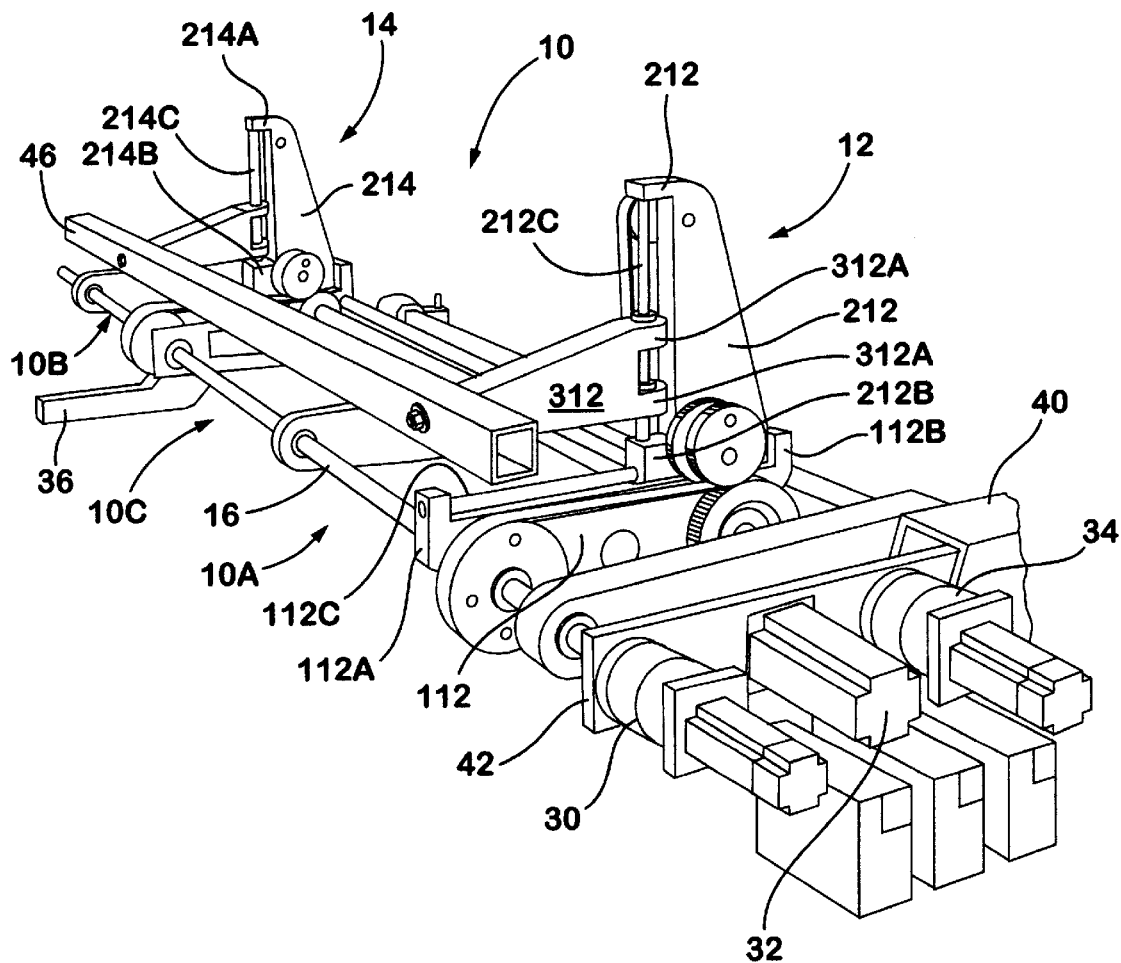
FIG. 2 is a perspective view of the first and second carrier assemblies, showing the control shafts and servomotors.

To further explain the foregoing and describe an exemplary preferred embodiment, reference is made to the attached drawings, which show a single such installation 10 (it being understood that, as mentioned above, a typical system will have two such installations disposed in mutually spaced, parallel relation). The overall nature of the installation 10 is best seen in FIGS. 1A, 1B, and 2, of which FIGS. 1A and 1B should be viewed together (side by side) since each shows a mutually opposite end portion 10A, 10B of a single continuous mechanism, the central portion 10C of which (which may optionally include one or more additional operating units like those contained in segments 10A and 10B) is broken away to facilitate representation in this larger-scale drawing.

Basically, it will be seen that the installation 10 includes a pair of carrier assemblies 12, 14 which are mounted in mutually spaced relation on three parallel, spaced control shafts 16, 18 and 20 that run essentially the entire length of the installation and are rotatably supported at each opposite end as well as along their length by mutually spaced support members 22, 24, 26, and 28. More particularly, control shafts 16, 18, and 20 terminate at support member 28, but the opposite ends extend through support member 22 and each is connected to an independent servomotor 30, 32, 34, which will independently rotate its associated control shaft under programmed computer drive control in a precise step-by-step, incremental manner (which will of course produce essentially continuous motion if a continuous succession of control pulses and resulting motion steps are commanded). A basic such installation will be supported upon some appropriate rigid, horizontal floor-mounted structure, or on rigidly braced piers or pylons (not shown), by rigid, fixedly mounted end support members 36, 38. In the illustrated embodiment, end support member 38 in turn mounts and supports a rigid L-shaped arm or housing member 40 having an outwardly projecting support beam or plate 42, which supports the three servomotors 30, 32, and 34, along with their associated drive components. Further, both support arm 40 and end support 36 receive and support an elongated connecting beam 44, which is preferably tubular in nature, that mounts and supports the mutually spaced supporting and stabilizing members 22, 24, 26, and 28 noted above, one end of which is slotted, as illustrated, so that it may be clamped rigidly in place upon the elongated connecting beam 44. Preferably, this beam member is keyed or otherwise non-rotatably attached to both end support member 36 and arm 40, so as to function as a stiffly resilient torsional spring support which will absorb, distribute, and damp out forces resulting from any vibratory motion or reactionary deflection of the control shafts 16, 18, and 20 which may occur during the loading, unloading, movement, and operation of the carrier assemblies 12 and 14 (as described further hereinafter).

Each of the carrier assemblies 12, 14 is identical to the other, but is a separate unit; however, the two such units are rigidly coupled together by (in this example) a tie bar 46 which extends between them and which is rigidly connected to each, to unify their operational movement as well as to execute their intended purpose or function and impart it to target objects such as workpieces. That is, the tie bar element 46 may function as a "finger bar," which actually engages the target objects (i.e., workpieces) to lift and carry a desired number of them along in tandem from station to station. Alternatively, tie bar 46 may carry article-engaging fingers, grippers, or other such members including articulated elements and assemblies thereof which may be remotely opened and closed, extended, etc. by use of such means as pneumatic cylinders, servomotors, etc. (not shown).

Basically, each of the carrier assemblies 12, 14 includes a base 112, 114, an upright support member 212, 214, which is movably supported upon an associated base 112, 114, and an operating arm 312, 314, which is movably supported on an associated upright support 212, 214. More particularly, each of the bases 112, 114 comprises a horizontally extending member which engages, and through which extends, the control shafts 16, 18, and 20 (as explained further hereinafter), and each such base also includes a pair of spaced upright support legs 112A, 112B (or 114A, 114B) which mount a horizontal guide rod 112C (or 114C). The upright supports 212, 214 are each mounted for sliding movement along a correspondingly numbered guide rod (1 12C or 114C), so as to be reciprocally movable therealong in a direction transverse to control shafts 16, 18, and 20. Each of the upright members 212, 214 also has a pair of mutually spaced and outwardly projecting support legs 212A, 212B (and 214A, 214B) which mount and support a second pair of guide rods 212C, 214C, and these support and guide the operating arms 312, 314, which preferably have a pair of mutually spaced mounting legs 312A, 312B (314A, 314B) which have a pair of axially aligned linear bearings through which the guide rods 212C, 214C extend in closely fitting relationship.

In the preferred embodiment under discussion, the upright members 212, 214 would, unless restrained, be pivotable about guide rods 112C, 114C, and the operating arms 312, 314 would be similarly pivotable about their corresponding guide rods 212C, 214C; however, all such motion is precluded by the connection between tie bar/finger bar 46 and operating arms 212, 214, which unifies and integrates the carrier assemblies 12 and 14, coordinating their operation. More particularly, this is accomplished in the preferred embodiment by providing a square (or otherwise non-round) aperture 48 (FIG. 1B) on the side of bar 46 which lies adjacent the end of the operating arms 312, 314, and providing a correspondingly shaped hub or boss 50 on the end of the operating arms which is closely receivable within the aperture 48. A threaded mechanical fastener 52 (stud and nut, or bolt receivable in a corresponding threaded opening in each boss 50) is used to maintain this secure engagement of bar 46 with each of the operating arms 312, 314. With this general arrangement, the tie bar/finger bar 46 actually becomes part of the operating arms and joins them together as a single operating unit; in addition, it precludes any of the aforementioned rotational movement with respect to any of the guide rods 112C, 212C, 114C, 214C, which might otherwise be possible, thereby imparting a high degree of precision and accuracy to the positioning of operating arms 312, 314 and the interconnected tie bar/finger bar 46 at all times.

It is to be noted that other generally comparable structures may also be used to accomplish at least part of the above mentioned purposes, for example, making the guide rods 112C, 114C, 212C, and 214C and their corresponding bearings or passages be noncircular in cross section (although this may make bearing choices, etc., more difficult and expensive).

As will be seen from the foregoing, each of the carrier assemblies 12, 14 is, by virtue of its structure and operational components, capable of moving tie bar/finger bar 46 back and forth perpendicular to control shafts 16, 18, and 20 (by moving upright members 212, 214 along guide rods 112C, 212C), and also capable of moving bar 46 upwardly and downwardly (by moving operating arms 312, 314 along guide rods 212C, 214C). Thus, as will be apparent upon reflection, by using various combinations and amounts of these movements the bar 46 may be moved to any given point within the 90° quadrant generally defined by the axes of guide rods 112C and 212C (and 114C, 214C, which is of course the same quadrant). Of course, the length and overall configuration of the system and its component parts, and especially of operating arms 312, 314, may be varied as desired; consequently, the effective quadrant in which bar 46 is movable may be located in practically any desired area and position relative to control shafts 16, 18, and 20, and these need not necessarily be disposed horizontally.

The coordinated motion of upright members 212, 214, and operating arms 312, 314 described above is uniquely accomplished in accordance with the present invention by the relative rotation of control shafts 16, 18, and 20, without other motion-imparting or control elements (such as motors or the like, etc.), as a function of the precisely controlled independent rotation of each such control shaft.

More particularly, carrier assemblies 12, 14 are reciprocally movable along the axis of control shafts 16, 18, and 20 by implementing shaft 18 in the form of a lead screw, and mounting a corresponding follower nut 52, through which shaft 18 extends, in each of the base members 112, 114, etc. Accordingly, as will be apparent, rotation of shaft 18 in one direction will move the carrier assemblies 12, 14 in a first direction along this shaft, and conversely. The coordinated movement of upright members 212, 214, and operating arms 312, 314 noted above is accomplished by relative and coordinated rotation of shafts 16 and 20. These shafts are preferably splined along their entire length and pass through, and engage, complementary hubs 54, 54A, 56, and 56A mounted at the center of a pair of belt pulleys 58, 58A, 60, and 60A, located on respectively, each side of and at the forward and rearward ends of the base members 112, 114. One of the hubs 54, 56 (or 54A, 56A) on each side of the base members 112, 114 is an operating hub which is rigidly coupled to its associated belt pulley, whereas the other such hub is merely a freely rotatable idler, with the operating hub for shaft 16 being on one side of the base member and the operating hub for shaft 20 being on the other side of that base member, for purposes described more fully hereinafter. Of course, each of the shafts 16 and 20 passes through a freely rotatably bearing or the like (not shown) mounted between the hubs and pulleys at each end of the base members 112, 114 (or else simply passes through an open aperture in the latter).

In addition to the elements just described, each of the carrier assemblies 12, 14 includes a pair of mutually adjacent and relatively rotatable belt-mounting hubs 62, 64 (FIG. 4) which are mounted side by side on one side of the upright members 212, 214 (e.g., the side facing servomotors 30, 32, and 34). At least one such hub (e.g., hub 62) is rotatably mounted on a generally concentrically disposed support shaft 66, and the other such hub (64) may either be fixed in place or similarly rotatable. Each of the hubs 62, 64 may include a curved slot 68, which is disposed generally concentric to support shaft 66 and which includes a series of transverse cog-like ridges, which are shaped to closely receive integral lugs or cleats 70 on a cogged belt 72 that extends around the belt pulleys 58, 60 described above, located alongside of and at the opposite ends of the base members 112, 114.

With the arrangement just described, a single length of belt 72 having a pair of free, oppositely disposed ends has one such end (e.g., end 72A shown in FIG. 4) captured within the ridged slot 68 of belt-mounting hub 62, and then extends around the adjacent curved portion of this hub, toward and around the forward pulley 58 (which has a ridged perimeter to engage the cleats or lugs 70 on belt 72), then back and around the opposite such pulley 60 (which also has a ridged periphery), and then extends horizontally and angularly upwardly to wrap partially around the other belt-mounting hub 64, where it engages and is captured in another curved and ridged engagement slot (not separately shown) like slot 68. As indicated above, at least one of the hubs 62, 64 (e.g., hub 62) is made to be rotatable relative to the other and a securement mechanism (such as a bolt 74 illustrated in FIG. 4), extends through an arcuate slot disposed concentric to shaft 66, with a washer or enlarged head overlapping the slot so that tightening the bolt clamps hub 62 tightly and non-rotatably against adjacent hub 64. Hub 62 may be rotated about shaft 66 when bolt and washer 74 are loosened. With this arrangement, rotation of belt-mounting hubs 62 and 64 to be rotated relative one another so as to apply a desired degree of tension to belt 72, in order to insure that no slippage occurs with respect to hubs 58, 60, etc. A less rigid, yieldable means for securing belt-mounting hubs 62, 64 could comprise a frictional or other slip-clutch mechanism operatively disposed therebetween, a simple form of which would be a frictional washer under bolt 74 or a frictional disc between hubs 62, 64 (or a threaded aperture extending axially into shaft 66 with a headed bolt disposed therein to hold a friction washer against the outer face of hub 62).

Figure 3:
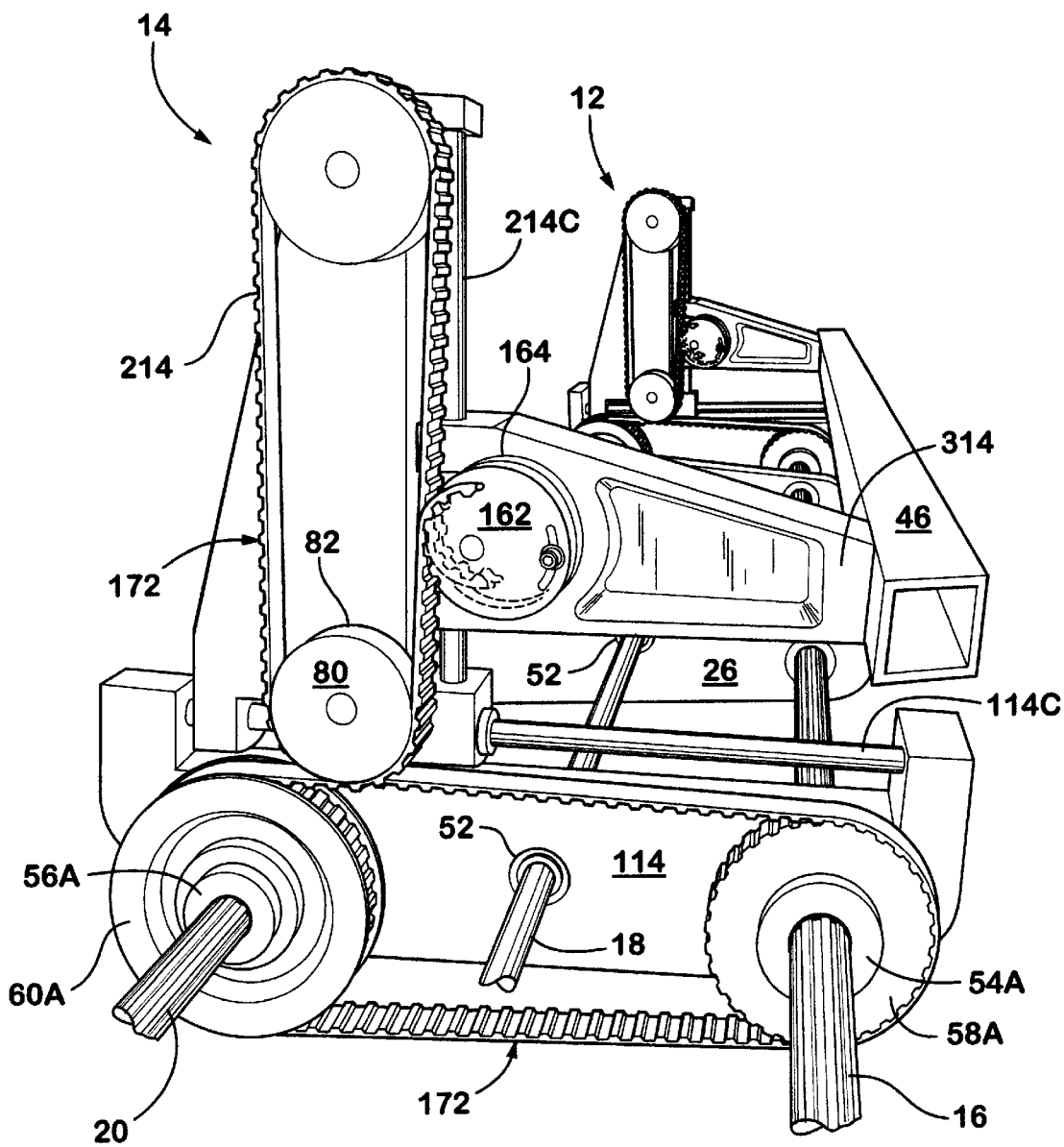
FIG. 3 is a fragmentary, perspective view of a carrier assembly showing the belt arrangement.

The side of the carrier assemblies 12, 14 opposite servomotors 30, 32, and 34 also has a positioning-belt (172) and pulley arrangement. This is best illustrated in FIGS. 1A, 1B, and 3, and includes a double, side-by-side pair of idler pulleys 80, 82 (preferably one piece), and another such pulley 90, all mounted on each upright member 212, 214, as well as a pair of side-by-side belt end-capturing hubs 162, 164 which are like hubs 62 and 64 described above but mounted on the side of each operating arm 312, 314. In addition, belt 172 is entrained around pulleys 58A and 60A, which engage control shafts 16 and 20 and are disposed alongside the base members 112, 114. Belt 172 has one end portion captured in a ridged, curved slot 168 formed in belt-mount hub 162, and the other end captured in a similar curved, ridged slot formed in the adjacent belt-mount hub 164. In between its ends, belt 172 extends (commencing from the end captured in hub 162) downwardly essentially vertically and around one side and the bottom of pulley 80, near the bottom of each upright member 212, 214, then rearwardly and around belt pulley 60A, forwardly and around belt pulley 58A, rearwardly again to pass around the bottom and one side of the inner lower pulley 82 (which is preferably one piece with pulley 80), then upwardly and around both sides and the top of upper pulley 90, and then vertically downward to the inside belt-mounting hub 164, where the end is captured in the corresponding curved, transversely ridged slot corresponding to slot 168. Preferably, the various pulleys in each set are arranged with respect to one another so as to provide the maximum amount of belt wrap around them.

Figure 4:
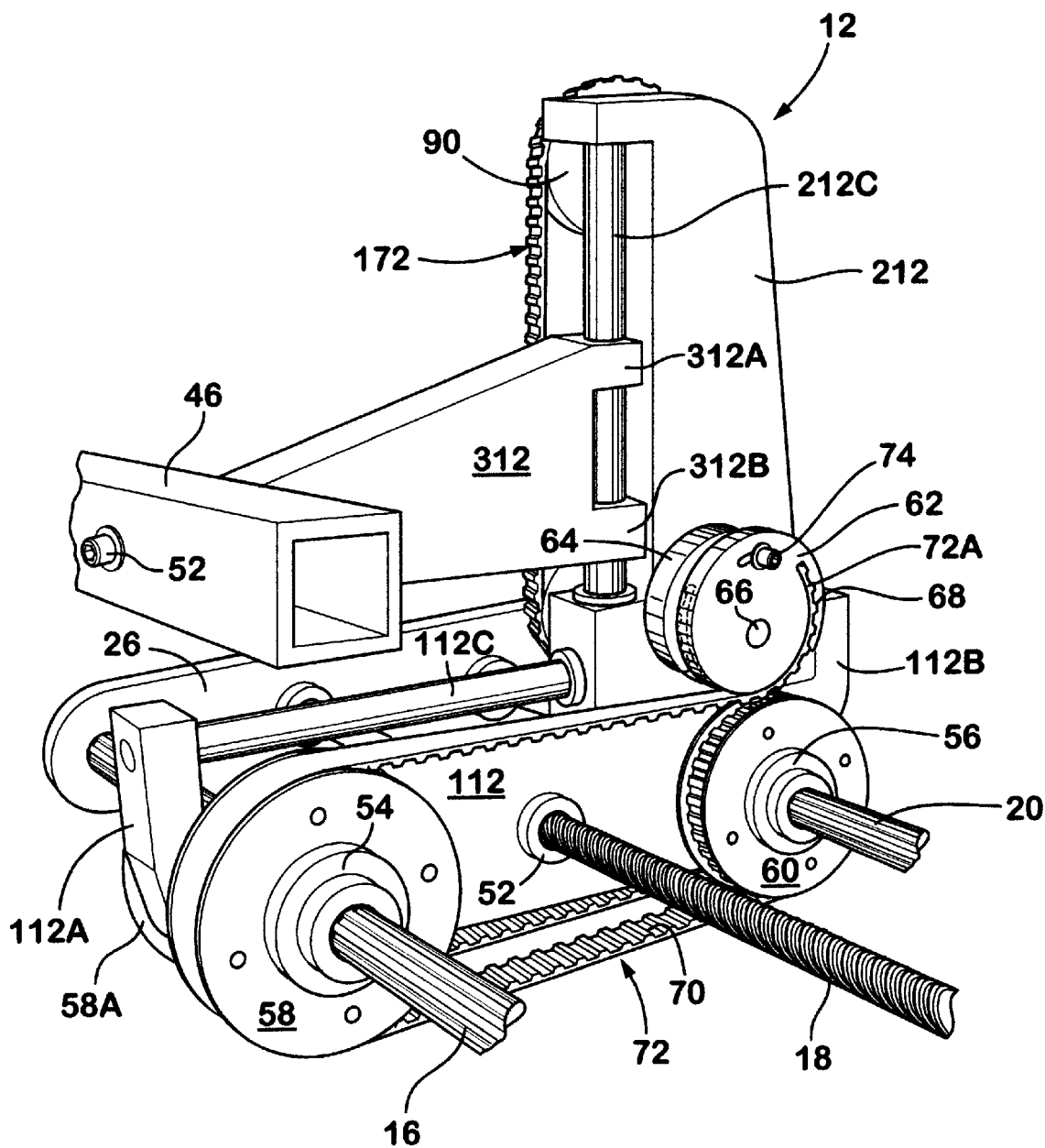
FIG. 4 is a fragmentary, perspective view of a carrier assembly showing the belt arrangement.

The belt drive arrangement described above produces a unique "pull—pull" positioning operation with respect to the movable components of carrier assemblies 12, 14, i.e. upright members 212, 214, and operating arms 312, 314, in response to the controlled step-by-step rotation of the splined control shafts 16 and 18. More particularly, when either such shaft is rotated, it causes rotation of the engaging (operating) drive hub 54, 54A, or 56, 56A. With reference to FIG. 4, and assuming that hub 54 is the operating such member, rotation of control shaft 16 in a counterclockwise direction (for example) will rotate pulley 58 in a similar direction, thereby pulling on the length of belt 72 between pulley 58 and capturing 62 and causing upright member 212 to move to the left as seen in FIG. 4. Of course, this effectively shortens the length of belt between hub 62 and pulley 58 and lengthens the amount of belt between capturing hub 64 and pulley 60, rotating the latter about its idler hub 56. As will be observed, rotation of control shaft 16 in the opposite direction will produce a corresponding but opposite movement of upright member 212 with respect to base 112.

Figure 5:
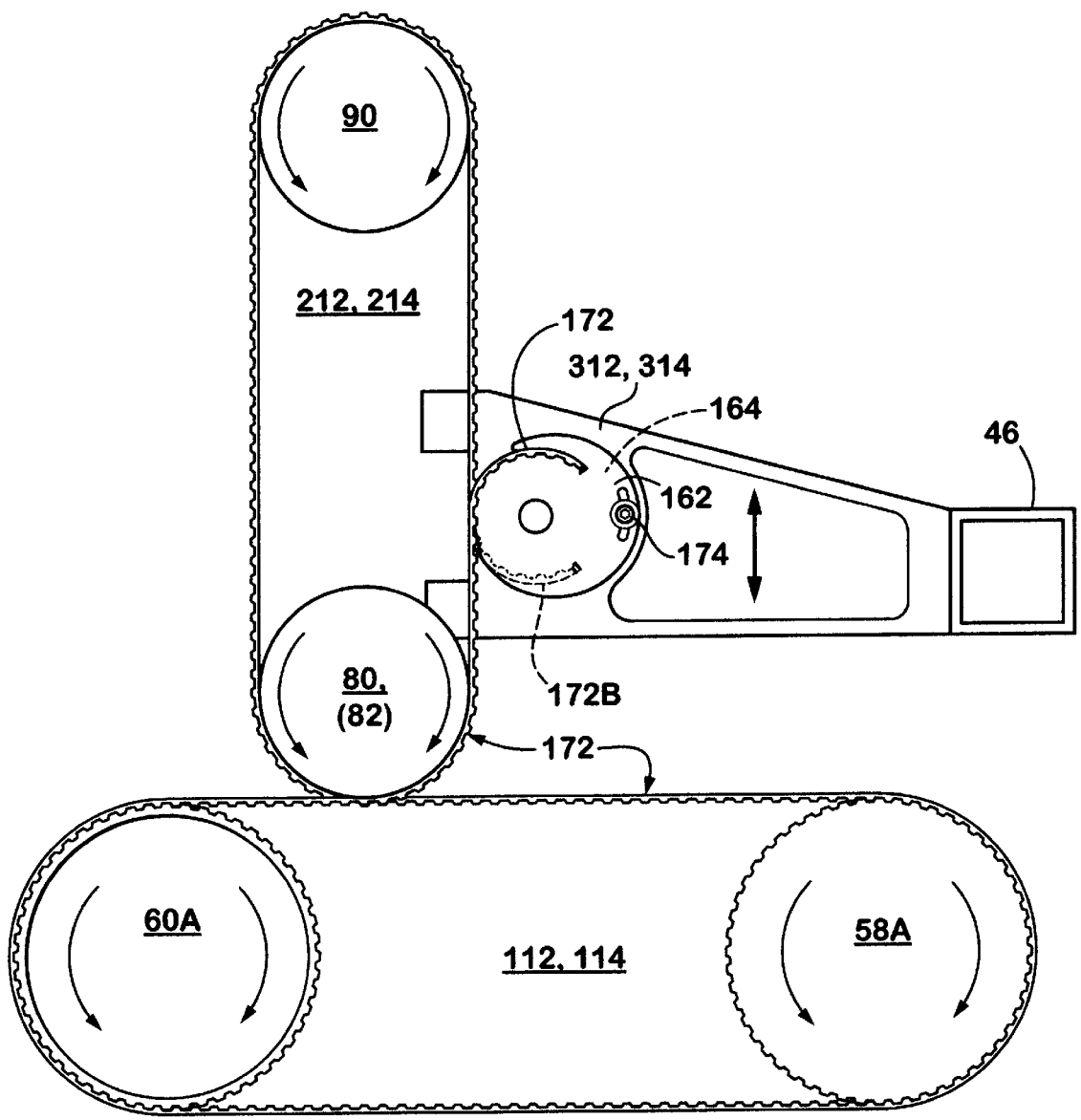
FIG. 5 is a partially schematic view of the belt and operating arm.
Figure 6:
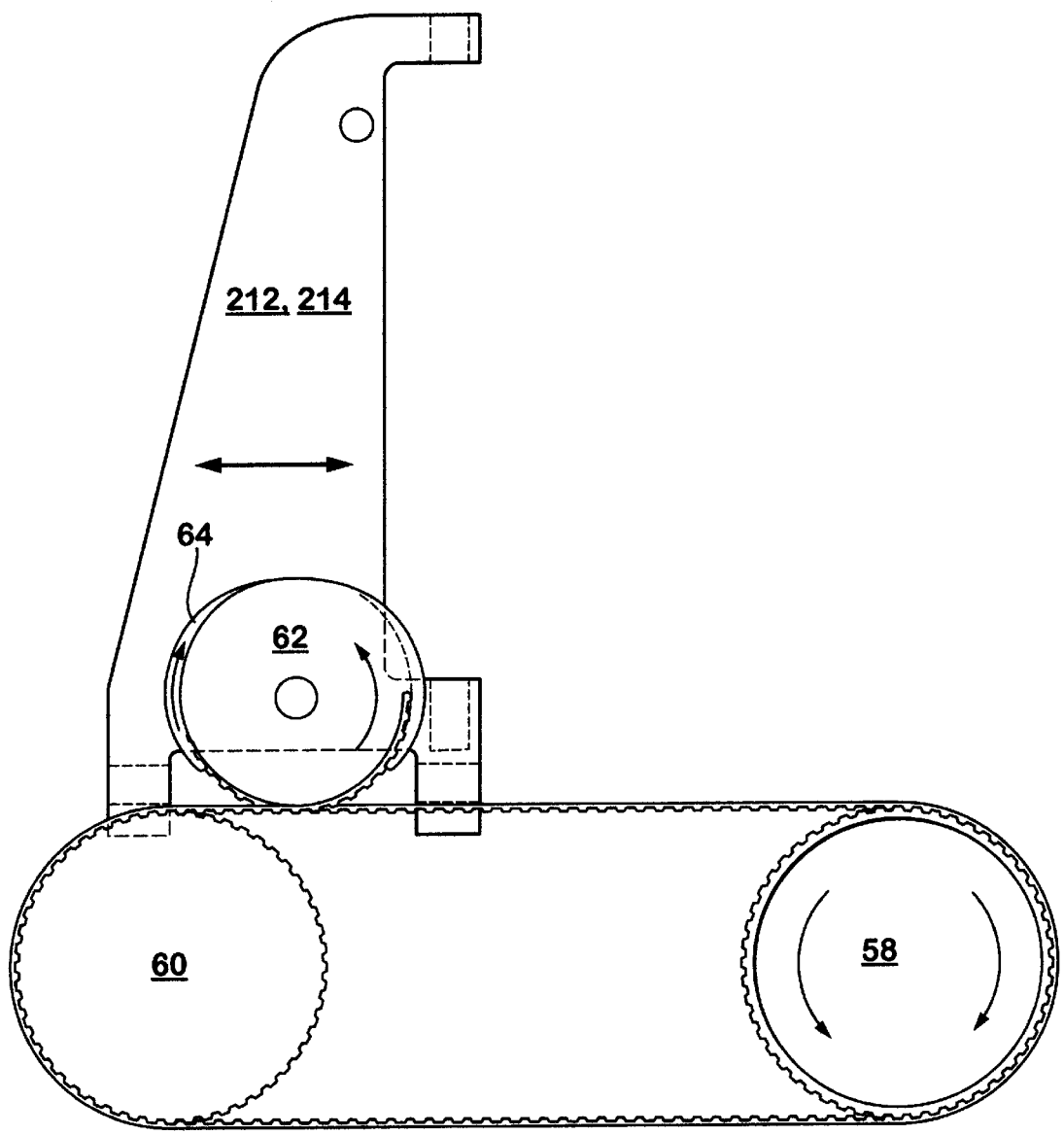
FIG. 6 is a partially schematic view of the belts and upright support.

Reciprocating motion of the operating arms 312, 314 along their respective guide rods 112C, 114C is accomplished in a generally similar manner by use of belt 172 and control shaft 20, together with the related hubs, pulleys, etc. on the opposite side of bases 112, 212 (see FIGS. 1A, 1B, and 3). In this case, however, hub 56A, engaging shaft 20, is the active member and drives belt pulley 60A while hub 54A, engaging shaft 16, merely spins (idles) with respect to its pulley 58A. Thus, rotation of shaft 20 in a counterclockwise direction (for example) will pull on the segment of belt 172 extending around the bottom and right side of pulley 80, captured in slot 168 of mounting hub 162, thereby moving the associated operating arm (312, 314) downwardly. Of course, when this happens the other portion of belt 172 become shorter; i.e. pulley 58A is rotated about control shaft 16, the portion of belt 172 extending between pulleys 82 and 90 slides upwardly and around pulley 90, and the length of belt between pulley 90 and mounting hub 164 increases. It goes without saying that rotation of control shaft 20 in the opposite direction produces the opposite movement of the control arms (i.e., upward). Schematic representations of the operating components and belt paths are provided by FIGS. 5 and 6, the latter of which depicts the arrangement of FIG. 4 as seen in mirror-image, i.e., as viewed from the opposite side of base 112, 114 or as implemented on that side, it being irrelevant which side carries which belt drive system.

From the foregoing, it will be clear that either control shaft 16 or 20 may be rotated independently of the other, and either separately from or simultaneously therewith. In either case, the operating arms 312, 314 of both carrier assemblies 12 and 14 will move exactly in the same manner, thereby moving bar 46 to some desired point in the aforementioned quadrant of available motion. Further, rotation of control shaft 18 will move both of the carrier assemblies 12 and 14 axially with respect to the three control shafts in either one direction or the other, and this may take place at any time, including the same time that control shafts 16 and/or 20 is/are being rotated.

Extremely accurate positioning and motion of the carrier assemblies 12, 14 and tie bar/finger bar 46 is obtained by insuring that belts 72, 172 are substantially inelastic, and that their cleats or cogs 70 are of rigid material which is not subject to substantial wear, and which is preferably smooth and has a low coefficient of friction. A good example of such a belt is one made of polyurethane plastic and aramid fiber, which is now available from many different sources on a standard commercial basis. In addition to the other attributes just noted, such belts have an extremely long life, are lightweight, easy to install, and need essentially no maintenance. Similarly, the upright members 212, 214, and operating arms 312, 314 are preferably mounted on their associated guide rods by use of polymer-lined linear bearings, which provide very smooth stick-free sliding motion with minimal clearance, to substantially eliminate off-axis motions which would cause inaccurate positioning of bar 46.

As indicated above, control shafts 16, 18, and 20 may be driven by servomotors 30, 32, and 34 located at one end thereof and coupled to their respective control shafts by rigid couplings. Servomotors 30, 32, and 34, are preferably pulse-actuated stepper-type motors such as the "HAME" series available from Mitsubishi Electronics America, Inc. (and known as its "Melservo-J" components), which utilize a corresponding servo-amplifier (designated as the "MR-J" series), which constitutes a directly compatible servomotor driver that is controllable by microprocessor or the like, in particular PLC-type controllers. Programmatic control is preferably accomplished by use of the system known as the "Visual Logic ControllerTm" available from Steeplechase Software of Ann Arbor, Michigan, which combines PLC programming and control with operating interface on the same computer and replaces the conventional separate PLC processor, PLC programming terminal, and operator interface panel, allowing use of a personal computer (PC) for direct control. The applications software specifically utilized can be any of a number of commercially available three-axis machine control programs, including the Steeplechase Visual Logic Controller.

It is believed that the significant advantages provided by the present invention will be apparent to and appreciated by those skilled in the art upon consideration of the foregoing disclosure, and it is to be noted once again that an underlying concept is advanced which is specifically different from those addressed by the prior state of the art, notwithstanding the superficially similar attributes. It is to be understood that the foregoing detailed description is merely that of certain exemplary preferred embodiments of the invention, and that numerous changes, alterations and variations may be made without departing from the underlying concepts and broader aspects of the invention as set forth in the appended General Statements of Invention, which are to be interpreted in accordance with the established principles of patent law, including the doctrine of equivalents.

What is claimed is:

1. A workpiece transfer apparatus, comprising:

a support member;

first and second control shafts, each defining an axis and rotatably supported by said support member in a parallel, spaced-apart configuration;

a workpiece support operably connected to said first and second control shafts, said workpiece support including an operating member shaped to support a workpiece and a base slidably mounted on said first and second control shafts and permitting shifting of said workpiece support along said axes of said first and second control shafts;

said operating member operably connected to said first control shaft, such that rotation of said first control shaft shifts said operating member in a vertical direction;

said operating member operably connected to said second control shaft, such that rotation of said second control shaft shifts said operating member in a horizontal direction; and wherein:

said base including a horizontal guide and a vertical guide;

said operating member slidably connected with said horizontal guide and with said vertical guide, such that rotation of said first and second control shafts shifts said operating member in horizontal and vertical directions along said guides;

a first drive pulley mounted on said first shaft and rotating therewith;

a first idler pulley rotatable mounted on said workpiece support base in a vertically spaced-apart relation from said drive pulley;

a first elongate flexible member having a portion thereof fixedly connected to said operating member, said flexible member extending around said idler pulley and said drive pulley, such that rotation of said first shaft vertically shifts said operating member; and including:

a second drive pulley mounted on said second drive shaft and rotating therewith;

a second idler pulley rotatably mounted on said base in a horizontally spaced-apart relationship to said second drive pulley; and a second elongate flexible member having a portion thereof fixedly connected to said operating member, said second flexible member extending around said second idler pulley, and around said second drive pulley, such that rotation of said second shaft horizontally shifts said operating member.

2. A workpiece transfer apparatus as set forth in claim 1, including:

a lead screw rotatably supported by said support member and disposed parallel to said first and second control shafts;

a follower nut mounted on said base of said workpiece support, said lead screw connected with said follower nut, such that rotation of said lead screw shifts said workpiece along said lead screw.

3. A workpiece transfer apparatus as set forth in claim 2, wherein:

said workpiece support is supported on said first and second control shafts and said lead screw.

4. A workpiece transfer apparatus as set forth in claim 3, wherein:

said first and second elongate flexible members comprise cogged belts.

5. A workpiece transfer apparatus as set forth in claim 4, including:
   a controller;
   a first servomotor connected to said first control shaft and rotating the same upon reception of a signal from said controller;
   a second servomotor connected to said second control shaft and rotating the same upon reception of a signal from said controller; and
   a third servomotor connected to said lead screw and rotating the same upon reception of a signal from said controller.

6. A workpiece transfer apparatus as set forth in claim 5, wherein:
   said workpiece support comprises a first workpiece support; and including:
   a second workpiece support, said second workpiece support having substantially the same configuration as said first workpiece support; and
   a substantially rigid member extending between and interconnecting said first and second workpiece supports.

7. A workpiece transfer apparatus as set forth in claim 6, wherein:
   said first and second cogged belts each define opposite free ends, wherein at least one free end of each belt is secured to a mounting member, said mounting member adjustably mounted to said operating member and adjustably tensioning said belts.

8. A workpiece transfer apparatus, comprising:
   a support member;
   a base having first and second linear guides mounted thereon;
   an operating member shaped to support a workpiece, said operating member slidably connected to said first and second linear guides;
   first and second drive shafts, each defining an axis and rotatably mounted to said support member;
   first and second idler shafts rotatably mounted to said base;
   said base slidably mounted on said first and second drive shafts such that said base can be shifted along said axes of said first and second drive shafts;
   said first idler shaft vertically spaced-apart from said first drive shaft;
   said second idler shaft horizontally spaced-apart from said second drive shaft;
   a first elongate flexible member extending around said first drive shaft and said first idler shaft, a portion of said first flexible member fixed to said operating member;
   a second elongate flexible member extending around said second drive shaft and said second idler shaft, a portion of said second flexible member fixed to said operating member;
   rotation of said first drive shaft vertically shifting said operating member along said first linear guide; and
   rotation of said second drive shaft horizontally shifting said operating member along said second linear guide.

9. A workpiece transfer apparatus as set forth in claim 8, wherein:
   said first drive shaft includes a first drive pulley mounted thereon;
   said second drive shaft includes a second drive pulley mounted thereon;
   said first idler shaft includes a first idler pulley rotatably mounted thereon;
   said second idler shaft includes a second idler pulley rotatably mounted thereon;
   said first elongate flexible member extending around said first drive pulley and said first idler pulley; and
   said second elongate flexible member extending around said second drive pulley and said second idler pulley.

10. A workpiece transfer apparatus as set forth in claim 9, wherein:
    said first and second drive shafts are rotatably supported by said support member in a parallel, spaced-apart configuration.

11. A workpiece transfer apparatus as set forth in claim 10, including:
    a third idler pulley rotatably mounted to said base and horizontally spaced-apart from said first drive pulley;
    a fourth idler pulley rotatably mounted to said base and vertically spaced-apart from said first drive pulley; and wherein:
    said first elongate flexible member extends around said third and fourth idler pulleys.

12. A workpiece transfer apparatus, comprising:
    a support member;
    a base having first and second linear guides mounted thereon;
    an operating member shaped to support a workpiece, said operating member slidably connected to said first and second linear guides;
    first and second drive shafts rotatably mounted to said base and rotatably supported by said support member in a parallel, spaced-apart configuration;
    said first drive shaft including first drive pulley mounted thereon;
    said second drive shaft including a second drive pulley mounted thereon;
    first and second idler shafts rotatably mounted to said base;
    said first idler shaft vertically spaced-apart from said first drive shaft;
    said second idler shaft horizontally spaced-apart from said second drive shaft; said first idler shaft including a first idler pulley rotatably mounted thereon;
    said second idler shaft including a second idler pulley rotatably mounted thereon;
    a first elongate flexible member extending around said first drive pulley and said first idler pulley, a portion of said first flexible member fixed to said operating member;
    a second elongate flexible member extending around said second drive pulley and said second idler pulley, a portion of said second flexible member fixed to said operating member;
    a third idler pulley rotatably mounted to said base and horizontally spaced-apart from said first drive pulley;
    a fourth idler pulley rotatably mounted to said base and vertically spaced-apart from said first drive pulley; and wherein:
    said first elongate flexible member extending around said third and fourth idler pulleys;
    rotation of said first drive shaft vertically shifting said operating member along said first linear guide;

rotation of said second drive shaft horizontally shifting said operating member along said second linear guide;

said second drive shaft defining an axis of rotation; and said third idler pulley defining an axis of rotation coincident with said axis of rotation of said second drive shaft.

13. A workpiece transfer apparatus as set forth in claim 12, including:

a lead screw rotatably supported by said support member and disposed parallel to said first and second control shafts;

a follower nut mounted on said base of said workpiece support, said lead screw connected with said follower nut, such that rotation of said lead screw shifts said workpiece along said lead screw.

* * * * *